US011797545B2

(12) United States Patent
Rivlin et al.

(10) Patent No.: US 11,797,545 B2
(45) Date of Patent: Oct. 24, 2023

(54) DYNAMICALLY GENERATING FACETS USING GRAPH PARTITIONING

(71) Applicant: International Business Machines Corporation, Armonk, NY (US)

(72) Inventors: Or Rivlin, Nesher (IL); Yosi Mass, Ramat Gan (IL); Haggai Roitman, Yoknea'm Elit (IL); David Konopnicki, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 16/854,102

(22) Filed: Apr. 21, 2020

(65) Prior Publication Data
US 2021/0326346 A1     Oct. 21, 2021

(51) Int. Cl.
*G06F 16/2457* (2019.01)
*G06F 16/901* (2019.01)
*G06N 3/08* (2023.01)

(52) U.S. Cl.
CPC .... *G06F 16/24578* (2019.01); *G06F 16/9024* (2019.01); *G06N 3/08* (2013.01)

(58) Field of Classification Search
CPC .. G06F 16/24578; G06F 16/9024; G06N 3/08
See application file for complete search history.

(56) References Cited

U.S. PATENT DOCUMENTS

| 8,971,665 B2* | 3/2015 | Zhang ................. G06K 9/6219 382/286 |
| 10,242,103 B2 | 3/2019 | Bivens et al. |
| 10,255,282 B2 | 4/2019 | Kenthapadi et al. |

(Continued)

FOREIGN PATENT DOCUMENTS

| CN | 101630314 A | 1/2010 |
| CN | 108228820 A | 6/2018 |

(Continued)

OTHER PUBLICATIONS

Thomas et al. ("Tasks, Queries, and Rankers in Pre-Retrieval Performance Prediction"; ADCS 2017, Dec. 7-8, 2017, Brisbane, QLD, Australia; © 2017 Copyright held by the owner/author(s). Publication rights licensed to Association; for Computing Machinery; ACM ISBN 978-1-4503-6391-4/7/12) (Year: 2017).*

(Continued)

*Primary Examiner* — Ken Hoang
(74) *Attorney, Agent, or Firm* — Barry D. Blount

(57) ABSTRACT

An example system includes a processor to receive concepts extracted from a result set corresponding to a query and result associations for each extracted concept. The processor is to build a graph based on the extracted concepts, wherein the graph comprises a number of nodes representing the extracted concepts and weighted edges representing similarity between concepts extracted from shared results. The processor is to partition the graph into subgraphs with vertices corresponding to candidate facets for vertices having higher sums of weighted edges. The processor is to rank the candidate facets. The processor is to select higher ranked candidate facets to use as facets. The processor is to output facets with a result set in response to the query.

20 Claims, 6 Drawing Sheets

(56) References Cited

U.S. PATENT DOCUMENTS

| | | | |
|---|---|---|---|
| 11,222,031 B1* | 1/2022 | Mohandas | G06F 40/30 |
| 2008/0114750 A1 | 5/2008 | Saxena et al. | |
| 2011/0307485 A1* | 12/2011 | Udupa | G06Q 30/02 |
| | | | 707/769 |
| 2011/0307819 A1* | 12/2011 | Vadlamani | G06F 16/951 |
| | | | 707/706 |
| 2013/0046769 A1 | 2/2013 | He et al. | |
| 2013/0144872 A1 | 6/2013 | Gupta et al. | |
| 2013/0226916 A1 | 8/2013 | Dredze et al. | |
| 2014/0229163 A1* | 8/2014 | Gliozzo | G06F 40/30 |
| | | | 704/9 |
| 2015/0254312 A1 | 9/2015 | Roy et al. | |
| 2018/0189417 A1* | 7/2018 | Freed | G06K 9/6218 |
| 2019/0065584 A1* | 2/2019 | Fukuda | G06F 16/93 |
| 2020/0059689 A1* | 2/2020 | Lin | H04N 21/4302 |
| 2020/0265048 A1* | 8/2020 | Dotan-Cohen | G06F 16/24522 |

FOREIGN PATENT DOCUMENTS

| | | |
|---|---|---|
| CN | 110111905 A | 8/2019 |
| NO | 2016/009312 A1 | 1/2016 |

OTHER PUBLICATIONS

Ansamma et al. ("Vertex Cover Algorithm Based Multi-Document Summarization Using Information Content of Sentences"; Procedia Computer Science 46 (2015), 285-291) (Year: 2015).*

Basu Roy, Senjuti, "Minimum effort driven dynamic faceted search in structured databases," CIKM'08, Napa Valley, California, USA, Oct. 26, 2008, 10 pages.

"Written Opinion of the International Searching Authority Issued in PCT Application No. PCT/IB2021/052213", dated Jun. 18, 2021, 7 pages.

Shnayderman, Hya et al, "Fast End-to-End Wikification," IBM Research AI, Haifa University, Mount Carmel, Haifa, HA 31905 Israel, Aug. 19, 2019, 5 pages.

Releases—wikipedia2vec_wikipedia2vec—GitHub, "Be Notified of new releases," May 24, 2018, 2 pages.

"Examination Report No. 1 for standard patent application Issued in Australian Application No. 2021261643" dated Mar. 21, 2023, 3 pages.

\* cited by examiner

100

200

DYNAMICALLY GENERATING FACETS USING GRAPH PARTITIONING

BACKGROUND

The present techniques relate to facets. More specifically, the techniques relate to generating facets dynamically.

SUMMARY

According to an embodiment described herein, a system can include processor to receive concepts extracted from a result set corresponding to a query and result associations for each extracted concept. The processor can also further build a graph based on the extracted concepts. The graph includes a number of nodes representing the extracted concepts and weighted edges representing similarity between concepts extracted from shared results. The processor can also partition the graph into subgraphs with vertices corresponding to candidate facets for vertices having higher sums of weighted edges. The processor can further rank the candidate facets. The processor can select higher ranked candidate facets to use as facets. The processor can also further output facets with a result set in response to the query.

According to another embodiment described herein, a method can include receiving, via a processor, a query, a result set corresponding to the query, and a knowledge base. The method can further include extracting, via the processor, concepts from the results sets using the knowledge base. The method can also further include building, via the processor, a graph based on the extracted concepts. The graph includes a number of nodes representing concepts and weighted edges representing similarity between concepts extracted from shared results. The method can also include partitioning, via the processor, the graph into subgraphs with vertices corresponding to candidate facets for vertices having higher sums of weighted edges. The method can further include ranking, via the processor, the candidate facets. The method can also further include selecting, via the processor, higher ranked candidate facets to use as facets. The method can also include outputting, via the processor, the facets with the result set in response to the query.

According to another embodiment described herein, a computer program product for facet generation can include computer-readable storage medium having program code embodied therewith. The computer readable storage medium is not a transitory signal per se. The program code executable by a processor to cause the processor to receive a query, a result set corresponding to the query, and a knowledge base. The program code can also cause the processor to extract concepts from the results sets using the knowledge base. The program code can also cause the processor to build a graph based on the extracted concepts. The graph includes a number of nodes representing concepts and weighted edges representing similarity between concepts extracted from shared results. The program code can also cause the processor to partition the graph into subgraphs with vertices corresponding to candidate facets for vertices having higher sums of weighted edges. The program code can also cause the processor to rank the candidate facets. The program code can also cause the processor to also further select higher ranked candidate facets to use as facets. The program code can also cause the processor to output the facets with the result set in response to the query.

DETAILED DESCRIPTION

Some systems provide filters for filtering search results. For example, a user may submit a search query, and in order to help the user narrow down the list of results, a system may suggest several filters for the user to choose. These filters are referred herein as facets. As used herein, facets refer to dimensions along which each result of a query may be classified. For example, a search engine on a website selling camera lenses may have a set of facets including camera type, lens focal length, lens speed, etc., for a query of a lens made by a particular manufacturer. These facets may be chosen by a system based on the results returned for the query. The system may then suggest one or more facets to a user to help narrow down the search results. In this way, the system may enable the classifications to be accessed and ordered in multiple ways rather than in a single, pre-determined, taxonomic order. However, such facets may be limited to a set of predefined facets. Such a search engine may not be able to automatically adapt to add facets for additional features as they emerge, such as auto-focus abilities, eye or face tracking capabilities, etc. Rather, such search engine may simply count the number of times a concept appears in a set of search results and display a set of predefined facets accordingly. Moreover, queries submitted to general search engines may have many different intents. For example, a submitted query of "jaguar" may be intended to refer to an animal or a car manufacturer. Predefining various sets of facets for all possible query intents may be very difficult if not impossible.

According to embodiments of the present disclosure, a processor of a system can receive concepts extracted from a result set corresponding to a query and result associations for each extracted concept. The processor can build a graph based on the extracted concepts, wherein the graph includes a number of nodes representing the extracted concepts and weighted edges representing similarity between the extracted concepts extracted from shared results. For example, two nodes may only share an edge if the concepts were detected together in at least one of the results. Weights may then be assigned to the edges based on similarity. The processor can partition the graph into subgraphs with vertices corresponding to candidate facets for vertices having higher sums of weighted edges. The processor can further rank the candidate facets. The processor can select higher ranked candidate facets to use as facets. The processor can then output facets with a result set in response to the query. Thus, embodiments of the present disclosure allow users to narrow down a result set of a query using the facets, which may reduce user effort in finding an intended result. The techniques enable the automated generation of facets from a set of predefined meaningful concepts.

Figure 1:
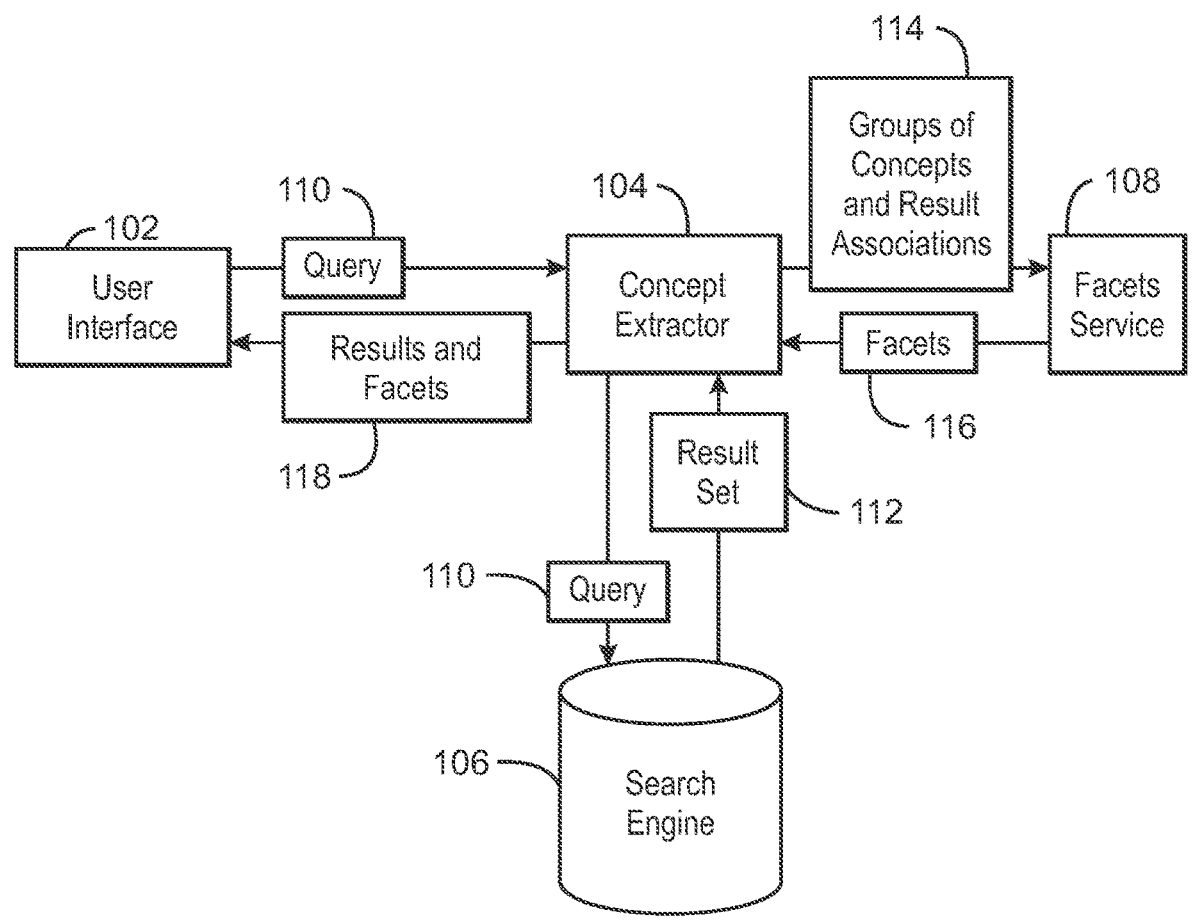
FIG. 1 is a block diagram of an example system for dynamically generating facets using graph partitioning.

With reference now to FIG. 1, a block diagram shows an example system for dynamically generating facets using graph partitioning. The example system is generally referred to by the reference number 100. In various examples, the system 100 may be used to implement the method 200 of FIG. 2, using the computing device 300 of FIG. 3.

The system 100 of FIG. 1 includes a user interface 102. The system 100 includes a concept extractor 104 communicatively coupled to the user interface 102. The system 100 also includes search engine 106 communicatively coupled to the concept extractor 104. The system 100 also includes a facets service 108 communicatively coupled to the concept extractor 104.

In the example of FIG. 1, the user interface 102 may receive a query 110 from a user and send the query to the concept extractor 104. The concept extractor 104 may forward the query 110 to the search engine 106. The search engine 106 can generate a result set 112 based on the query and send the result set 112 to the concept extractor 104. For example, the result set may be a set of documents.

The concept extractor 104 can then generate groups of concepts with result associations. For example, each group of concepts may be associated with a particular result in the result set 112. In various examples, the concept extractor 104 may have access to a closed set of high-level categories for one or more domains. As one example, for the domain of computer science, the arXiv archive computer science categories may be used. For example, these categories include "artificial intelligence", "computation and language", "computational complexity", "computational engineering", "finance, and science, computational geometry", "computer science and game theory", "computer vision and pattern recognition", "computers and society", "cryptography and security", "data structures and algorithms", "databases", "digital libraries", discrete mathematics", distributed, parallel, and cluster computing", "emerging technologies", "formal languages and automata theory", "general literature", "graphics", "hardware architecture", "human-computer interaction", "information retrieval," information theory", "logic in computer science", among other categories. The concept extractor 104 may also have access to a knowledge base. For example, the knowledge base may be Wikipedia. The high level categories for one or more domains can be mapped to categories of the knowledge base. In various examples, a mention detection may be run as part of the concept extractor 104 ingestion pipeline and mentions are stored in an index. For example, the mention detection tool may be any suitable general purpose mention detection tool, such as TagMe, first version released in 2010, a natural language understanding (NLU) tool, or a Term Wikifier (TW). The concept extractor 104 may apply the mention detection tool to all documents in the result set 112. In various examples, the concept extractor 104 can traverse the category tree of the knowledge base and keep only those concepts whose categories are under the hierarchy of the domain. For example, only those concepts whose categories lead to one of the above categories of the hierarchy of the domain may be included in the groups of concepts with result associations 114. The concept extractor 104 can send the groups of concepts with result associations 114 to the facets service 108. As one example, the paper "Sparsity-certifying Graph Decompositions" was parsed to extract concepts using a mention detection tool. The surface form of the extracted concepts as appearing in the paper were: "Pebble game", "spanning trees", "matroid", "verticies", and "terminology". The extracted concepts associated with these phrases were: "Pebble game", "Spanning tree", "Matroid", "Vertex (graph theory)", and "terminology". The corresponding high level categories associated with these concepts were: "computational complexity theory", "computational complexity theory", "discrete mathematics", "discrete mathematics", and "computational linguistics".

In various examples, the concepts extracted by the concept extractor 104 using the mention detection tool may still include concepts that are not very informative. For example, the concepts may be too general for use as filters. To continue the example above, the concepts "verticies" and "terminology" may not be very helpful for use as facets. In some examples, the concept extractor 104 can refine the set of concepts using information from the knowledge base. For example, if a concept mentioned frequently in the knowledge base has few inlinks, it may likely be very generic. Therefore, the concept extractor 104 can remove concepts with a number of inlinks that does not exceed a first threshold or exceeds a higher second threshold. For example, a concept with high number of inlinks may be too general so it is not very informative) In various examples, the concept extractor 104 can further filter the extracted concepts. In some examples, concept extractor 104 can filter the extracted concepts by long paths from top level categories. For example, extracted concepts with a path longer than a threshold path p may be filtered from the concepts with result associations 114. In some examples, the concept extractor 104 can filter the extracted concepts by pre-retrieval query performance prediction (QPP) features. For example, the concept extractor 104 can use QPP to estimate if a query is difficult based on properties of query terms. As one example, a "clarity" property may be measured as the difference of probability of a term in a collection compared to the average probability of all terms. The concept extractor 104 can filter out concepts with low clarity value. In various examples, the concept extractor 104 can calculate similar properties for the concepts.

The facets service 108 can dynamically generate facets 116 based on the groups of concepts with result associations 114 using graph partitioning. Given a query and a result set containing concepts, the facets service 108 can rank the concepts according to some objective. For example, the facets service 108 can rank concepts by their ability to extract homogeneous intents from the result set. In some examples, the facets service 108 can select the top-k concepts to maximize the objective and use the top-k concepts as facets. The facets service 108 can rank concepts by maximizing the separation of the result set to a diversified set of user intents.

For example, the facets service 108 can build a graph from the extracted concepts. The facets service 108 can model the co-occurrence of concepts in the groups of concepts with result associations 114 as nodes connected by edges in an undirected graph. In some examples, the nodes may be weighted based on the number of inlinks of the concepts that the nodes represent, as described above.

As noted above, an edge may exist between two nodes representing concepts in the graph if the two concepts appear together in at least one of the results in the result set 112. In some examples, an edge weight may also be included to indicate the similarity between those concepts. For example, the weight of the edge may represent the similarity between the concepts. In various examples, the facets service 108 can weigh edges using a normalized pairwise mutual information (PMI) or a normalized Google distance (NGD). For example, the facets service 108 can calculate a normalized Google distance between two concepts x and y using corpus data via the equation:

$$NGD(x, y) = \frac{\max\{\log(f(x)), \log(f(y))\} - \log(f(x, y))}{\log(N) - \min\{\log(f(x)), \log(f(y))\}} \quad \text{Eqn. 1}$$

where f(x) is the number of pages that concept x appears in the knowledge base, f(y) is number of pages that concept y appears in the knowledge base, f(x,y) is number of pages that both concepts x and y appear in the knowledge base, and N is the total number of pages in the knowledge base. In various examples, the facets service 108 can calculate a normalized PMI using corpus data via the equation:

$$NPMI(x, y) = \frac{\log\left(\frac{p(x, y)}{p(x)p(y)}\right)}{-\log(p(x, y))} \quad \text{Eqn. 2}$$

where p(x) is the number of inlinks of x, p(y) is the number of inlinks of x, and p(x,y) is the number of pages that point to both x and y. For example, the number of inlinks of x may be the number of links to x, or number of pages that point to x in the knowledge base. In some examples, the facets service 108 can calculate similarity between concepts using a cosine similarity between pretrained embeddings of a knowledge base, such as Wikipedia. For example, pretrained embeddings for words may be created using Word2vec, first released in 2013. Pretrained embeddings for concepts in Wikipedia may be created using Wikipedia2vec, version 0.2.4 first released in May 2018.

In various examples, the facets service 108 can filter the groups of concepts by choosing a vertex corresponding to one of the concepts as a candidate facet to filter results. For example, results filtered by a candidate facet may only contain concepts that are neighbors of the facet in the graph. Choosing a particular concept as a candidate facet thus partitions the graph into a subgraph and a remaining portion of the graph. In some examples, the candidate facets may be chosen by selecting a vertex that yields the most highly related concepts in the resulting subgraph. The resulting subgraph may thus be homogenous, so as to represent a distinct user intent. For example, the sum of edge weights in the subgraph induced by partitioning the graph using a candidate facet may represent the homogeneity of the subgraph. In various examples, candidate facets may be chosen based on a sum of the weights exceeding some threshold homogeneity. The resulting candidate facets may be dynamic facets that represent different distinct intents of a user in submitting the query.

In various examples, the facets service 108 can then rank the candidate facets using a utility function. For example, the facets service 108 can rank the candidate facets using the equation:

$$U(c_i) = w_n(c_i) \Sigma_{c_l, c_m \in \{c_i \cup N(c_i)\}} w_e(e_{lm}) \quad \text{Eqn. 3}$$

where $N(c_i)$ is the neighbors of candidate facet $c_i$ and $w_n$ is the node weight. The node weight helps avoid facets that are too generic. In various examples, the facets service 108 can calculate the utility of each candidate facet in a predetermined number of top documents in a result set. For example, the facets service 108 can calculate the utility of each of the candidate facets in the 100 top documents of the result set. The facets service 108 can then rank the candidate facets according to the calculated utility. In some examples, the facets service 108 can approximate the ranking using a graph neural network to improve speed. In various examples, the facets service 108 can include a predetermined number of top candidate facets in the set of facets 116. For example, a top 10 number of facets may be returned to be used in the set of facets 116.

Still referring to FIG. 1, the facets service 108 can send the resulting set of facets 116 to the concept extractor 104. The concept extractor 104 can generate results and facets 118 including the facets 116 along with the results from the result set 112. The concept extractor 104 can send the results and facets 118 to the user interface 102 to be displayed to a user. Thus, in response to sending out a query, the user interface may display a set of results and facets 118. As one example, a query of "combinatorial optimization for Natural Language Processing" may return results along with the facets: "Combinatorics", "Machine learning", "Structured prediction", "Combinatorial optimization", "Algorithm", "Loss function", "Approximation algorithm", "Complexity class", "Natural language processing", and "Permutation". As another example, a query of "Extractive document summarization" may return a set of results and the facets: "Automatic summarization", "Natural language processing", "Supervised learning", "Word embedding", "Social media", "Word2vec", "Self-information", "Natural language generation", "Multi-document summarization", and "Loss function".

A user may then select one or more facets for filtering of the results. For example, the user interface 102 may receive a selection of one of the facets and filter the results displayed to the user accordingly. For example, in response to the user selecting a facet, the result set is filtered to show only results that contain the selected facet. A new concepts graph may then be built from the filtered results and new facets calculated and suggested back to the user. In this manner, the user may be able to more efficiently search a variety of topics.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional user interfaces, queries, results, groups of concepts, facets, search engines, or additional concept extractors, etc.).

Figure 2:
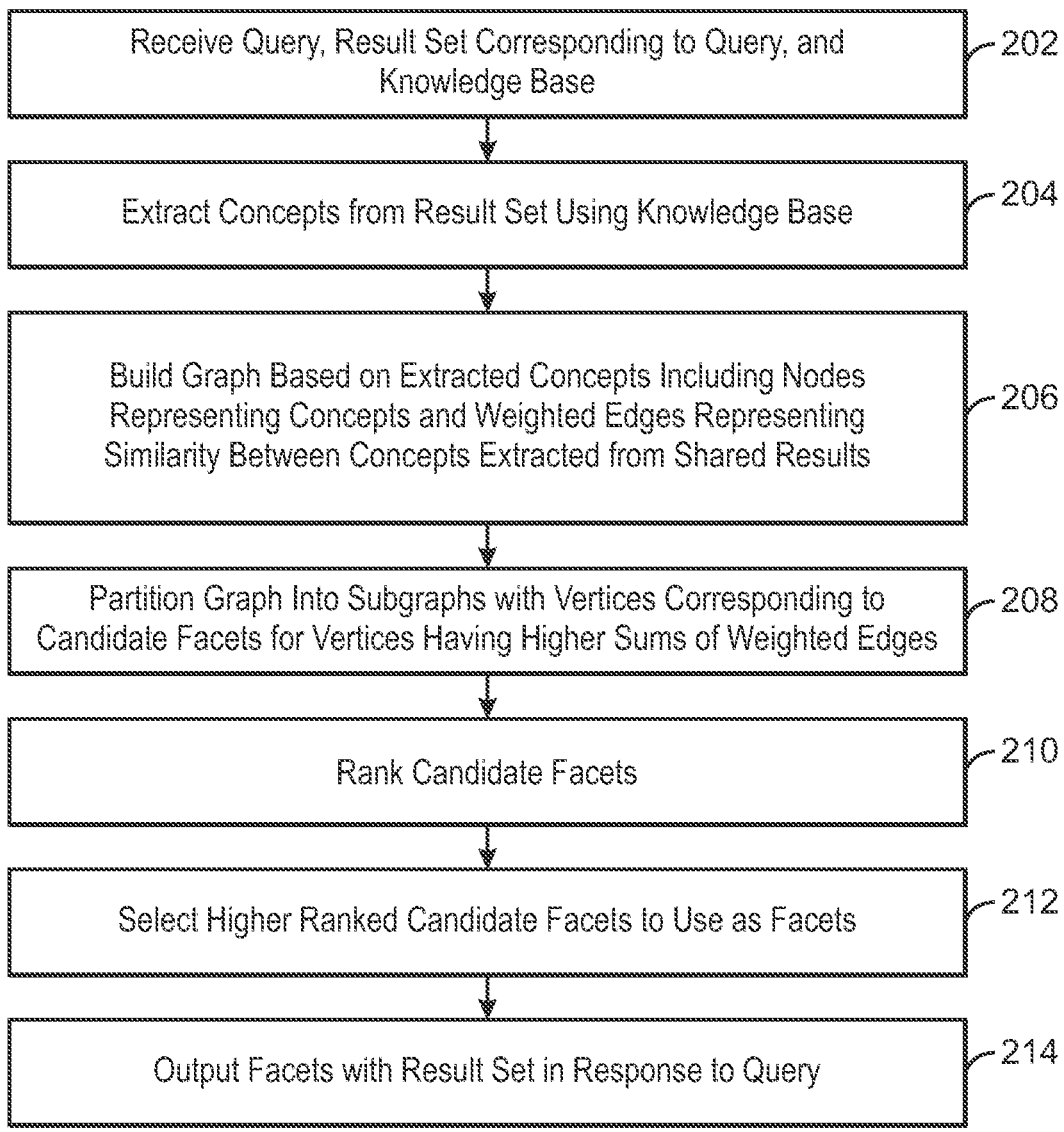
FIG. 2 is a block diagram of an example method that can dynamically generate facets using graph partitioning.

FIG. 2 is a process flow diagram of an example method that can dynamically generate facets using graph partitioning. The method 200 can be implemented with any suitable computing device, such as the computing device 300 of FIG. 3 and is described with reference to the system 100 of FIG. 1. For example, the method 200 can be implemented using the processor 302 of computing device 300 or the processor 602 of FIGS. 3 and 6.

At block 202, a processor receives a query, a result set corresponding to the query, and a knowledge base. For example, the result set may be received from a search engine in response to sending the search engine the query. In various examples, the knowledge base may be a knowledge graph. As one example, the knowledge base may be Wikipedia.

At block 204, the processor extracts concepts from the results sets using the knowledge base. In some examples, the processor can filter the extracted concepts by long paths from top level categories. In various examples, the processor can filter the extracted concepts by pre-retrieval QPP features.

At block 206, the processor builds a graph based on the extracted concepts, where the graph includes a number of nodes representing concepts and weighted edges representing similarity between concepts extracted from shared results. For example, an edge may only be generated between two nodes if the two concepts were detected in a same result. Weights may then be assigned to the edges based on similarity. In some examples, the processor can calculate a weight for each of the nodes based on a number of inlinks of the concept each node represents. In various examples, the processor can calculate a weight for each of the edges using a normalized pairwise mutual information (PMI) or a normalized Google distance (NGD).

At block 208, the processor partitions the graph into subgraphs with vertices corresponding to candidate facets for vertices having higher sums of the weighted edges.

At block 210, the processor ranks the candidate facets. In some examples, the processor can calculate a utility for each of the candidate facets and rank the candidate facets by the calculated utility. In various examples, the processor can approximate the ranking of the candidate facets using a graph neural network. For example, the graph neural network may be trained to rank candidate facets by the suggested utility instead of calculating the utility for each concept.

At block 212, the processor selects higher ranked candidate facets to use as facets. At block 214, the processor outputs the facets with the result set in response to the query.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the method 200 may also include, in response to receiving a selected facet, filtering the result set to show only results that contain the selected facet. The method 200 may also include building a new concepts graph from the filtered results, calculating new facets, and outputting the new facets.

In some scenarios, the techniques described herein may be implemented in a cloud computing environment. As discussed in more detail below in reference to at least FIGS. 3-6, a computing device configured to dynamically generate facets using graph partitioning may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
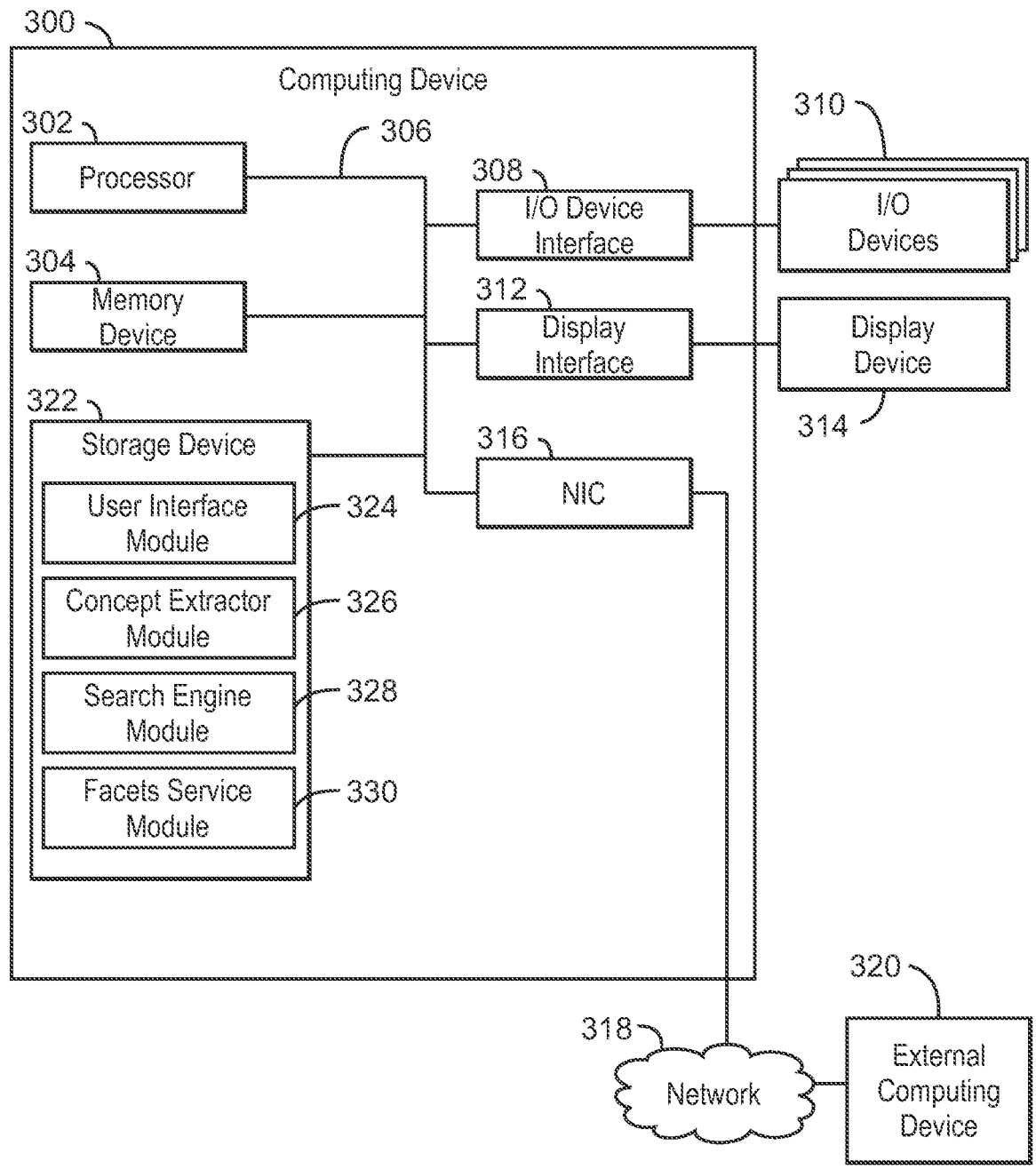
FIG. 3 is a block diagram of an example computing device that can dynamically generate facets using graph partitioning.

FIG. 3 is block diagram of an example computing device that can dynamically generate facets using graph partitioning. The computing device 300 may be for example, a server, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. An external computing device 320 may connect to the computing device 300 through the network 318. In some examples, external computing device 320 may be an external web-server 320. In some examples, external computing device 320 may be a cloud computing node.

The processor 302 may also be linked through the system interconnect 306 to a storage device 322 that can include a hard drive, an optical drive, a USB flash drive, an array of drives, or any combinations thereof. In some examples, the storage device may include a user interface module 324, a concept extractor module 326, a search engine module 328, and a facets service module 330. The user interface module 324 can receive a query and send the query to the concept extractor module 326. The concept extractor module 326 can receive a query, a result set corresponding to the query, and a knowledge base. In some examples, the concept extractor module 326 can receive the result set from the search engine module 328. The concept extractor module 326 can extract concepts from the results sets using the knowledge base. For example, the concept extractor module 326 can extract the concepts from the result set corresponding to the query using a knowledge base. In some examples, the concept extractor module 326 can map high level categories for a domain to categories of the knowledge base. In various examples, the concept extractor module 326 can apply a mention detection tool to all documents in the result set to extract the concepts. In some examples, the concept extractor module 326 can traverse the category tree of the knowledge base and extract concepts whose categories are under the hierarchy of a domain. In various examples, the concept extractor module 326 can filter the extracted concepts based on the number of pages that contain mentions of the concept. The search engine module 328 can receive a query and generate a result set based on the query. The facets service module 330 can build a graph based on the extracted concepts. The graph number includes a number of nodes representing concepts and weighted edges representing similarity between concepts extracted from shared results. In some examples, the facets service module 330 can calculate the similarity between concepts using a cosine similarity between pre-trained embeddings of the knowledge base. In various examples, the facets service module 330 can calculate a weight for each of the number of nodes based on a number of inlinks of the concept each node represents. In various examples, the facets service module 330 can calculate a weight for each of the edges using a normalized pairwise mutual information (PMI) or a normalized Google distance (NGD). The facets service module 330 can partition the graph into subgraphs with vertices corresponding to candidate facets for vertices having higher sums of weighted edges. The facets service module 330 can rank the candidate facets. In some examples, the facets service module 330 can calculate a utility for each of the candidate facets and rank the candidate facets by the calculated utility. In some examples, the facets service module 330 can approximate the ranking of the candidate facets using a graph neural network. The facets service module 330 can select higher ranked candidate facets to use as facets. The facets service module 330 can then output facets with a result set in response to the query.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). Furthermore, any of the functionalities of the user interface module 324, the concept extractor module 326, the search engine module 328, and the facets service module 330, may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the user interface module 324, the concept extractor module 326, the search engine module 328, and facets service module 330, can be implemented with logic, wherein the logic, as referred to herein, can include any suitable hardware (e.g., a processor, among others), software (e.g., an application, among others), firmware, or any suitable combination of hardware, software, and firmware.

Figure 4:
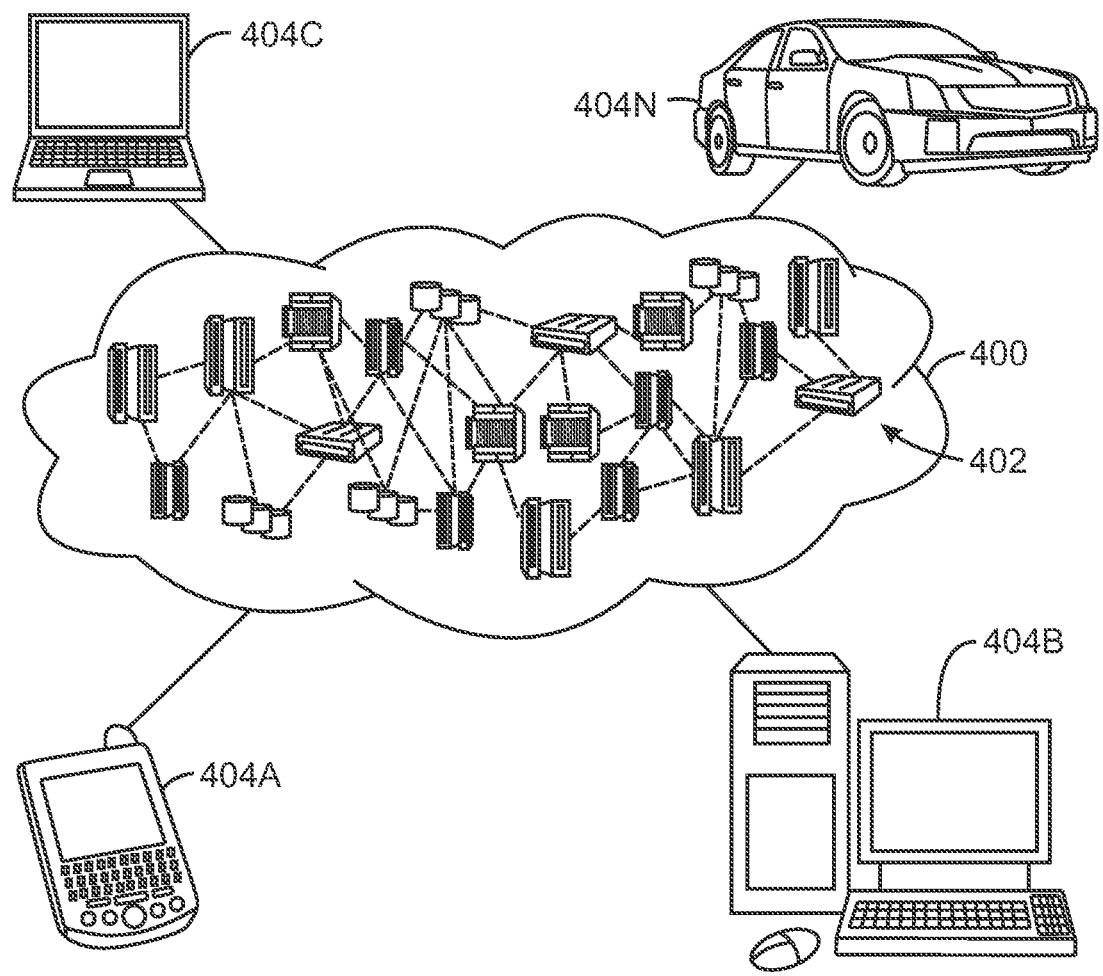
FIG. 4 is a diagram of an example cloud computing environment according to embodiments described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
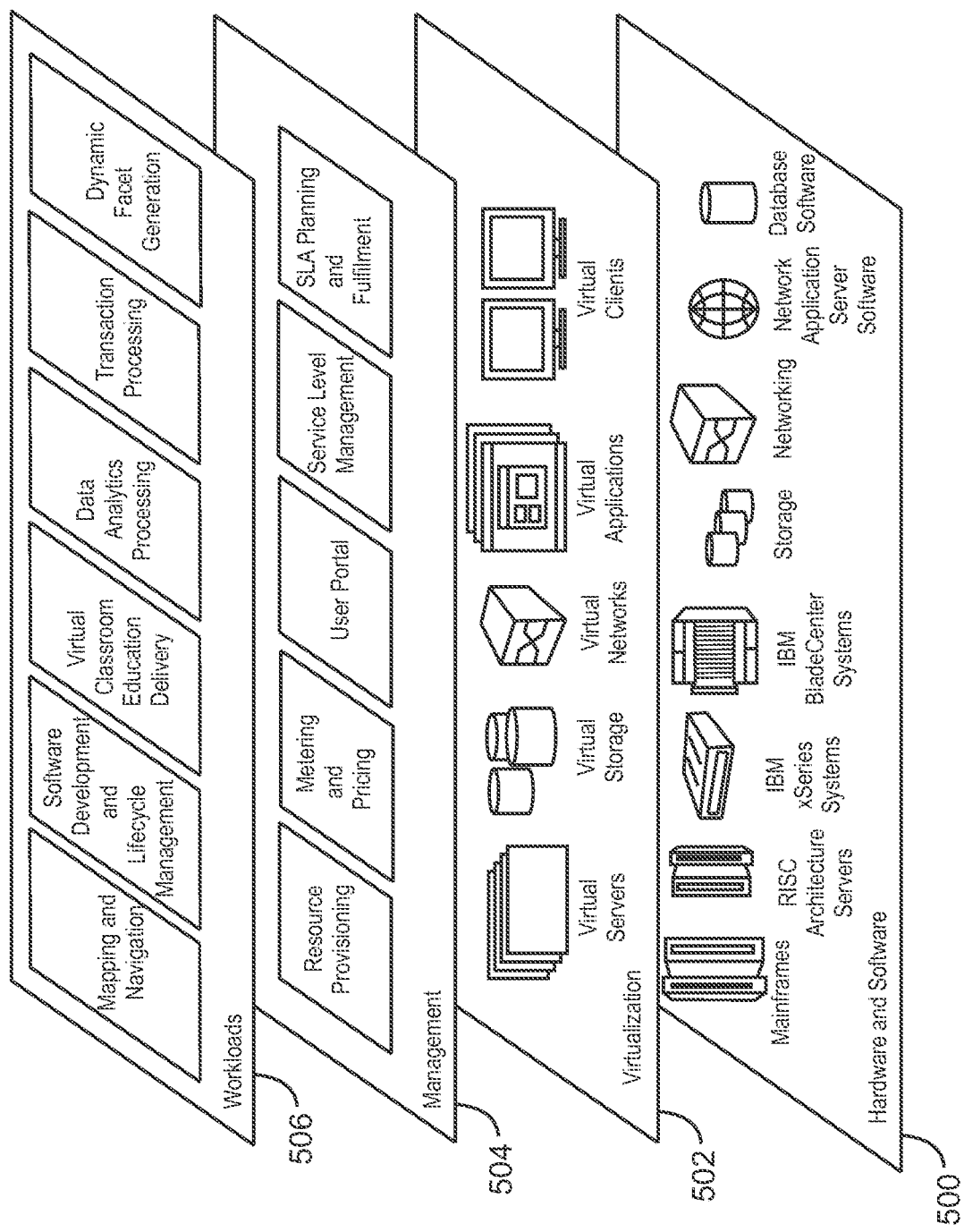
FIG. 5 is a diagram of an example abstraction model layers according to embodiments described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture-based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and dynamic facet generation.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
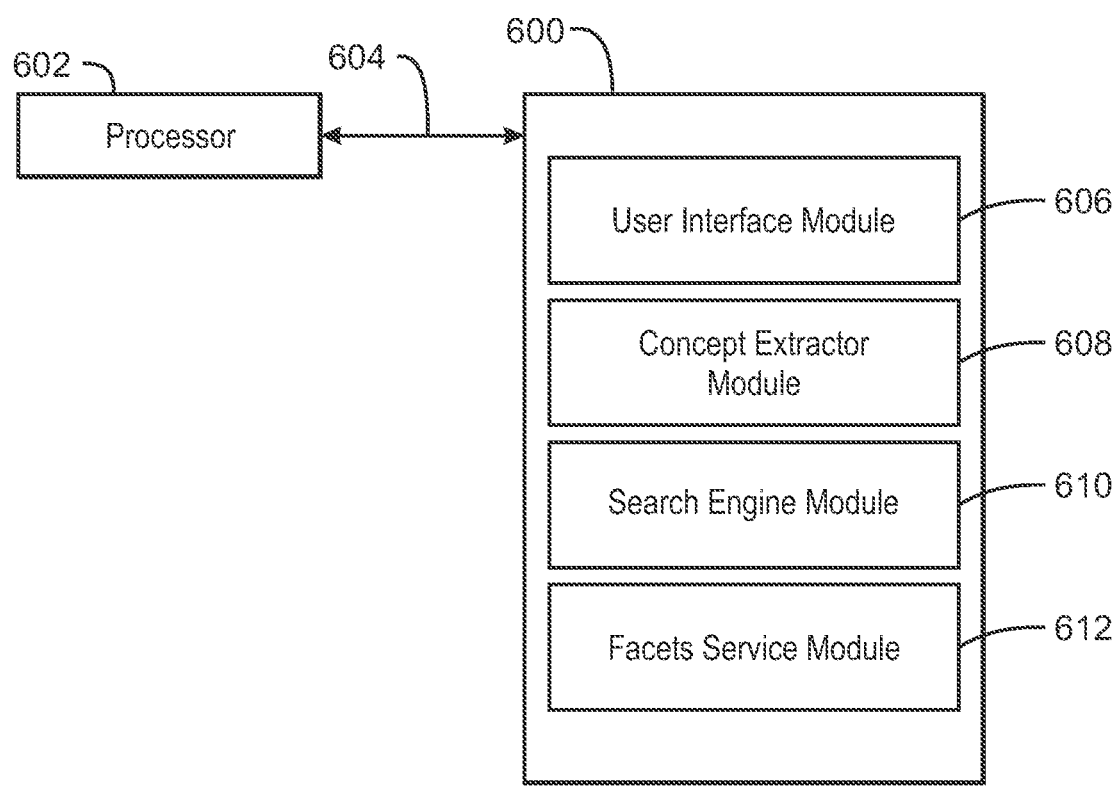
FIG. 6 is an example tangible, non-transitory computer-readable medium that can dynamically generate facets using graph partitioning.

Referring now to FIG. 6, a block diagram is depicted of an example tangible, non-transitory computer-readable medium 600 that can dynamically generate facets using graph partitioning. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 200 of FIG. 2.

The various software components discussed herein may be stored on the tangible, non-transitory, computer-readable medium 600, as indicated in FIG. 6. For example, a user interface module 606 includes code to receive and forward a query. The user interface module 606 also includes code to receive and display a set of results and facets. A concept extractor module 608 includes code to receive a query, a result set corresponding to the query, and a knowledge base. The concept extractor module 608 further includes code to extract concepts from the results sets using the knowledge base. A search engine module 610 includes code to receive a query and generate a result set based on the query. A facets service module 612 includes code to build a graph based on the extracted concepts. The graph includes a number of nodes representing concepts and weighted edges representing similarity between concepts extracted from shared results. For example, the facets service module 612 also includes code to calculate the similarity between concepts using a cosine similarity between pretrained embeddings of the knowledge base. In some examples, the facets service module 612 further includes code to calculate a weight for each of the number of nodes based on a number of inlinks of the concept each node represents. In various examples, the facets service module 612 further includes code to calculate a weight for each of the edges using a normalized pairwise mutual information (PMI) or a normalized Google distance (NGD). The facets service module 612 further includes code to partition the graph into subgraphs with vertices corresponding to candidate facets for vertices having higher sums of weighted edges. The facets service module 612 also includes code to rank the candidate facets. For example, the facets service module 612 may include code to calculate a utility for each of the candidate facets and rank the candidate facets by the calculated utility. In some examples, the facets service module 612 also includes code to approximate the ranking of the candidate facets using a graph neural network. The concept extractor module 608 further includes code to select higher ranked candidate facets to use as facets. The facets service module 612 also includes code to output the facets with the result set in response to the query. It is to be understood that any number of additional software components not shown in FIG. 6 may be included within the tangible, non-transitory, computer-readable medium 600, depending on the particular application.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   receive concepts extracted from a result set corresponding to a query and result associations for each extracted concept;
   build a graph based on the extracted concepts, wherein the graph comprises a plurality of nodes representing the extracted concepts and weighted edges representing similarity between concepts extracted from shared results;
   partition the graph into subgraphs, wherein each of the subgraphs is associated with a vertex in the graph having a sum of weighted edges exceeding a threshold, wherein each subgraph comprises the vertex representing a candidate facet and neighbor nodes of the candidate facet in the graph;
   rank the candidate facets by ability to extract homogeneous intents from the result set;
   select a predetermined number of top-k ranked candidate facets of the ranked candidate facets to use as facets; and
   output facets with a result set in response to the query.

2. The system of claim 1, wherein the concepts are extracted from the result set corresponding to the query using a knowledge base.

3. The system of claim 2, wherein the processor is to map high level categories for a domain to categories of the knowledge base.

4. The system of claim 2, wherein the processor is to apply a mention detection tool to all documents in the result set to extract the concepts.

5. The system of claim 2, wherein the processor is to traverse the category tree of the knowledge base and extract concepts whose categories are under the hierarchy of a domain.

6. The system of claim 1, wherein the processor is to filter the extracted concepts based on the number of pages that contain mentions of the concept.

7. The system of claim 1, wherein each of the plurality of nodes is weighted based on a number of inlinks of the concept each node represents.

8. A computer-implemented method, comprising:
   receiving, via a processor, a query, a result set corresponding to the query, and a knowledge base;
   extracting, via the processor, concepts from the results sets using the knowledge base;
   building, via the processor, a graph based on the extracted concepts, wherein the graph comprises a plurality of nodes representing concepts and weighted edges representing similarity between concepts extracted from shared results;
   partitioning, via the processor, the graph into subgraphs, wherein each of the subgraphs is associated with a vertex in the graph having a sum of weighted edges exceeding a threshold, wherein each subgraph comprises the vertex representing a candidate facet and neighbor nodes of the candidate facet in the graph;
   ranking, via the processor, the candidate facets by ability to extract homogeneous intents from the result set;
   selecting, via the processor, a predetermined number of top-k ranked candidate facets of the ranked candidate facets to use as facets; and
   outputting, via the processor, the facets with the result set in response to the query.

9. The computer-implemented method of claim 8, wherein building the graph comprises calculating a weight for each of the plurality of nodes based on a number of inlinks of the concept each node represents.

10. The computer-implemented method of claim 8, wherein building the graph comprises calculating a weight for each of the edges using a normalized Google distance (NGD).

11. The computer-implemented method of claim 8, wherein ranking the candidate facets comprises calculating a utility for each of the candidate facets and ranking the candidate facets by the calculated utility.

12. The computer-implemented method of claim 8, wherein ranking the candidate facets comprises approximating the ranking of the candidate facets using a graph neural network.

13. The computer-implemented method of claim 8, comprising filtering the extracted concepts by long paths from top level categories.

14. The computer-implemented method of claim 8, comprising filtering the extracted concepts by pre-retrieval query performance prediction (QPP) features.

15. A computer program product for facet generation, the computer program product comprising a computer-readable storage medium having program code embodied therewith, the program code executable by a processor to cause the processor to:
   receive a query, a result set corresponding to the query, and a knowledge base;
   extract concepts from the results sets using the knowledge base;
   build a graph based on the extracted concepts, wherein the graph comprises a plurality of nodes representing concepts and weighted edges representing similarity between concepts extracted from shared results;
   partition the graph into subgraphs, wherein each of the subgraphs is associated with a vertex in the graph vertices having a sum of weighted edges exceeding a threshold, wherein each subgraph comprises the vertex representing a candidate facet and neighbor nodes of the candidate facet in the graph;
   rank the candidate facets by ability to extract homogeneous intents from the result set;
   select a predetermined number of top-k ranked candidate facets of the ranked candidate facets to use as facets; and
   output the facets with the result set in response to the query.

16. The computer program product of claim 15, further comprising program code executable by the processor to calculate a weight for each of the plurality of nodes based on a number of links of the concept each node represents.

17. The computer program product of claim 15, further comprising program code executable by the processor to calculate a weight for each of the edges using a normalized Google distance (NGD).

18. The computer program product of claim 15, further comprising program code executable by the processor to calculate a utility for each of the candidate facets and rank the candidate facets by the calculated utility.

19. The computer program product of claim 15, further comprising program code executable by the processor to approximate the ranking of the candidate facets using a graph neural network.

20. The computer program product of claim 15, further comprising program code executable by the processor to calculate the similarity between concepts using a cosine similarity between pretrained embeddings of the knowledge base.

\* \* \* \* \*